United States Patent [19]
Johnson et al.

[11] Patent Number: 5,560,008
[45] Date of Patent: Sep. 24, 1996

[54] REMOTE AUTHENTICATION AND AUTHORIZATION IN A DISTRIBUTED DATA PROCESSING SYSTEM

[75] Inventors: Donavon W. Johnson, Georgetown; Todd A. Smith, Austin, both of Tex.

[73] Assignee: International Business Machines Corporation, Armonk, N.Y.

[21] Appl. No.: 352,075

[22] Filed: May 15, 1989

[51] Int. Cl.$^6$ .................................................. G06F 15/163
[52] U.S. Cl. .................................. 395/650; 364/DIG. 1; 364/284.4; 395/200.09
[58] Field of Search .................................. 364/200, 900; 395/650, 725

[56] References Cited

U.S. PATENT DOCUMENTS

| | | | |
|---|---|---|---|
| 4,218,738 | 8/1980 | Matyas et al. | 364/200 |
| 4,317,957 | 3/1982 | Sendrow | 178/22.08 |
| 4,423,287 | 12/1983 | Zeidler | 178/22.08 |
| 4,430,728 | 2/1984 | Beitel et al. | 364/900 |
| 4,438,824 | 3/1984 | Mueller-Schloer | 178/22.08 |
| 4,498,132 | 2/1985 | Ahlstrom et al. | 364/200 |
| 4,578,530 | 3/1986 | Zeidler | 178/22.09 |
| 4,578,567 | 3/1986 | Graszow et al. | 235/380 |
| 4,584,639 | 4/1986 | Hardy | 364/200 |
| 4,652,698 | 3/1987 | Hale et al. | 380/24 |
| 4,652,990 | 3/1987 | Pailen et al. | 364/200 |
| 4,672,572 | 6/1987 | Alsberg | 364/900 |
| 4,685,055 | 8/1987 | Thomas | 364/200 |
| 4,780,821 | 10/1988 | Crossley | 364/200 |
| 4,825,354 | 4/1989 | Agrawal et al. | 264/200 |
| 4,947,318 | 8/1990 | Mineo | 364/200 |
| 4,956,769 | 9/1990 | Smith | 364/200 |

OTHER PUBLICATIONS

S. P. Miller et al, "Kerberos Authentication and Authorization System", Massachusetts Institute of Technology, Oct. 27, 1988, pp. 1–36.

J. G. Steiner et al, "Kerberos: An Authentication Service for Open Network Systems", Winter USENIX, 1988, Dallas, TX. pp. 1–15.
S. R. Kleiman., "Vnodes: An Architecture for Multiple File System Types in Sun UNIX", pp. 238–247.
Sandberg, R. et al, "Design and Implementation of the Sun Network Filesystems", pp. 119. 130.
Walsh, Dan et al, "Overview of the Sun Network File System", pp. 117–124.
Chang, JoMei, "Status Monitor Provides Network Locking Service for NFS", pp. 1–3.
Chang, JoMei, "SunNet", pp. 71–75.
Taylor, Bradley, "Secure Networking in the Sun Environment", pp. 28–36.
Rifkin et al, "RFS Architectural Overview", pp. 1–12.
Hamilton, Richard et al, "An Administrator's View of Remote File Sharing", pp. 1–9.
Houghton, Tom et al, "File System Switch", pp. 1–2.
Olander, David J. et al, "A Framework for Networking in System V", pp. 1–8.

*Primary Examiner*—Thomas M. Heckler
*Attorney, Agent, or Firm*—Marilyn D. Smith; Diana L. Roberts

[57] ABSTRACT

The system and method of this invention authorizes a process running at a client data processing system to have access to a service at a server data processing system. The data processing systems are connected by a communication link in a distributed processing environment. A set of credentials for the process are created at the server in response to a message from the client requesting a service. The server returns a credentials id identifying the created set of credentials to the client process. The client uses this returned id in subsequent requests and is authorized access as controlled by the set of credentials identified by the returned id in the subsequent request. The server can deny access to the service by the process if the id returned in a subsequent request is determined by the server not to identify the set of credentials. The server denies the access if the server requires an authentication of the process.

24 Claims, 9 Drawing Sheets

REQUEST_FOR_SERVICE ⌒410

REMOTE AUTHENTICATION AND AUTHORIZATION IN A DISTRIBUTED DATA PROCESSING SYSTEM

CROSS-REFERENCE TO RELATED APPLICATIONS

Application Seer. No. 07/014,897 filed Feb. 13, 1987, in the name of Johnson et al for "A System And Method For Accessing Remote Files In A Distributed Networking Environment", now U.S. Pat. No. 4,887,204, herein incorporated by reference.

Application Ser. No. 07/352,090 filed May 15, 1989, in the name of Johnson et al for "Maintenance Of File Attributes In A Distributed Data Processing System", now U.S. Pat. No. 5,118,519, herein incorporated by reference.

Application Ser. No. 07/352,220 filed May 15, 1989, in the name of Morgan et al for "File Extension By Clients In A Distributed Data Processing System", abandoned, herein incorporated by reference.

Application Ser. No. 07/352,518 filed May 15, 1989, in the name of Loucks et al for "A Flexible Interface To Authentication Services In A Distributed Data Processing System", abandoned, herein incorporated by reference.

Application Ser. No. 07/352,080 field May 15, 1989, in the name of D. W. Johnson et al for "File Lock Management In A Distributed Data Processing System", abandoned, herein incorporated by reference.

Application Ser. No. 07/352,084 filed May 15, 1989, in the name of D. W. Johnson et al for "System and Method for Efficient Control of Cached Data in a Distributed Data Processing System", now U.S. Pat. No. 5,175,851, herein incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a plurality of data processing systems connected by a communications link, and more particularly to the authentication and authorization of a process at one of the data processing systems for the use of a service at another one of the data processing systems.

2. Description of the Related Art

As shown in FIG. 1, a distributed networking environment 1 consists of two or more nodes A, B, C, connected through a communication link or a network 3. The network 3 can be either a local area network (LAN), or a wide area network (WAN).

At any of the nodes A, B, C, there may be a processing system 10A, 10B, 10C, such as a workstation. Each of these processing systems 10A, 10B, 10C, may be a single user system or a multi-user system with the ability to use the network 3 to access files located at a remote node. For example, the processing system 10A at local node A, is able to access the files 5B, 5C at the remote nodes B, C, respectively.

Within this document, the term "server" will be used to indicate the processing system where the file is permanently stored, and the term "client" will be used to mean any other processing system having processes accessing the file. It is to be understood, however, that the term "server" does not mean a dedicated server as that term is used in some local area network systems. The distributed services system in which the invention is implemented is truly a distributed system supporting a wide variety of applications running at different nodes in the system which may access files located anywhere in the system.

As mentioned, the invention to be described hereinafter is directed to a distributed data processing system in a communication network. In this environment, each processor at a node in the network potentially may access all the files in the network no matter at which nodes the files may reside.

Other approaches to supporting a distributed data processing system are known. For example, IBM's Distributed Services for the AIX operating system is disclosed in Ser. No. 014,897 "A System and Method for Accessing Remote Files in a Distributed Networking Environment", filed Feb. 13, 1987 in the name of Johnson et al. In addition, Sun Microsystems has released a Network File System (NFS) and Bell Laboratories has developed a Remote File System (RFS). The Sun Microsystems NFS has been described in a series of publications including S. R. Kleiman, "Vnodes: An Architecture for Multiple File System Types in Sun UNIX", *Conference Proceedings, USENIX* 1986 *Summer Technical Conference and Exhibition*, pp. 238 to 247; Russel Sandberg et al., "Design and Implementation of the Sun Network Filesystem", *Conference Proceedings, Usenix* 1985, pp. 119 to 130; Dan Walsh et al., "Overview of the Sun Network File System", pp. 117 to 124; JoMei Chang, "Status Monitor Provides Network Locking Service for NFS", JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", *USENIX Conference Proceedings*, Atlanta, Ga. (June 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

One feature of the distributed services system in which the subject invention is implemented which distinguishes it from the Sun Microsystems NFS, for example, is that Sun's approach was to design what is essentially a stateless server. This means that the server does not store any information about client nodes, including such information as which client nodes have a server file open in read_only or read_write modes. Such an implementation simplifies the design of the server because the server does not have to deal with error recovery situations which may arise when a client fails or goes off-line without properly informing the server that it is releasing its claim on server resources.

An entirely different approach was taken in the design of the distributed service system in which the present invention is implemented. More specifically, the distributed services system may be characterized as a "stateful implementation". A "stateful" server, such as that described here, does keep information about who is using its files and how the files are being used. This requires that the server have some way to detect the loss of contact with a client so that accumulated state information about that client can be discarded. The cache management strategies described here cannot be implemented unless the server keeps such state information.

The problems encountered in accessing remote nodes can be better understood by first examining how a stand-alone system accesses files. In a stand alone system, such as 10 as shown in FIG. 2, a local buffer 12 in the operating system 11 is used to buffer the data transferred between the permanent storage 2, such as a hard file or a disk in a workstation, and the user address space 14. The local buffer 12 in the operating system 11 is also referred to as a local cache or kernel buffer.

In the stand-alone system, the kernel buffer 12 is divided into blocks 15 which are identified by device number, and logical block number within the device. When a read system call 16 is issued, it is issued with a file descriptor of the file 5 for a byte range within the file 5, as shown in step 101, FIG. 3. The operating system 11 takes this information and converts it to device number, and logical block numbers in the device, step 102, FIG 3. If the block is in the cache, step 103, the data is obtained directly from the cache, step 105. In the case where the cache doesn't hold the sought for block at step 103, the data is read into the cache in step 104 before proceeding with step 105 where the data is obtained from the cache.

Any data read from the disk 2 is kept in the cache block 15 until the cache block 15 is needed for some purpose. Consequently, any successive read requests from an application 4 that is running on the processing system 10 for the same data previously read is accessed from the cache 12 and not the disk 2. Reading from the cache is far less time consuming than reading from the disk.

Similarly, data written from the application 4 is not saved immediately on the disk 2, but is written to the cache 12. This saves disk accesses if another write operation is issued to the same block. Modified data blocks in the cache 12 are saved on the disk 2 periodically.

Use of a cache in a stand-alone system that utilizes an AIX operating system improves the overall performance of the system since disk accessing is eliminated for successive reads and writes. Overall performance is enhanced because accessing permanent storage is slower and more expensive than accessing a cache.

In a distributed environment, as shown in FIG. 1, there are two ways the processing system 10C in local node C could read the file 5A from node A. In one way, the processing system 10C could copy the whole file 5A, and then read it as if it were a local file 5C residing at node C. Reading a file in this way creates a problem if another processing system 10A at another node A modifies the file 5A after the file 5A has been copied at node C as file 5C. The processing system 10C would not have access to these latest modifications to the file 5A.

Another way for processing system 10C to access a file 5A at node A is to read one block, e.g., N1, at a time as the processing system at node C requires it. A problem with this method is that every read has to go across the network communication link 3 to the node A where the file resides. Sending the data for every successive read is time consuming.

Accessing files across a network presents two competing problems as illustrated above. One problem involves the time required to transmit data across the network for successive reads and writes. On the other hand, if the file data is stored in the node to reduce network traffic, the file integrity may be lost. For example, if one of the several nodes is also writing to the file, the other nodes accessing the file may not be accessing the latest updated data that has just been written. As such, the file integrity is lost since a node may be accessing incorrect and outdated files.

As shown above, there is more than one node in a distributed system. Each node may try to communicate with any of the other nodes since users on one node may need to use the services of a remote node. Before the communication between the nodes can be established that will allow a user at one node to sue the resources at another node, two steps are first required: authentication and authorization.

Ser. No. 07/352,518 filed concurrently herewith on May 15, 1989 in the name of Loucks et al for "A Flexible Interface to Authentication Services In A Distributed Data Processing System", herein incorporated by reference, describes methods for authentication in which a user convinces a remote node that the use is who the user represents the user to be. Some of the methods include the use of presenting passwords. Other more complex methods include presenting a ticket that was received from a Kerberos based authentication server. Regardless of the authentication method used, once the authentication is performed, the remote machine knows who the user is. Authentication in general is an expensive operation. The authentication operation may include sending messages to the authentication server, for example to get a ticket. Therefore, it is not desirable to authenticate every message. However, if authentication is performed only once, the remote machine must remember the results of the authentication in case the same user accesses the remote machine at a later time. This causes problems for the remote server machine. For example, the remote server machine may run out of memory space, or the remote server machine may be powered down, losing the authentication information. In addition, it may be impractical for the remote machine to store this authentication information if the user does not use the remote machine again for a very long period of time. This would waste the remote machines resources a long period of time without being needed. In addition, the authentication may change over this long period of time.

Similarly, besides authentication, there is a problem of authorizing the user to utilize a service or resource of the remote machine. Once the remote machine has authenticated the user, the remote machine has to decide what level of authorization the user is to have in attempting to access the resources of the remote machine. The authorization operation is also an expensive operation.

In the AIX operating system, there are well defined authorization policies for controlling access or local resources by local users in a stand alone machine. These authorization decisions are made by these well defined security policies as described in the AIX Operating System Technical Reference, second edition, Sep. 1986, order number SV21-8009, part number 74X9990, chapter 2 under system calls open and chmod, and described in the AIX Operating System Commands Reference, First Edition, November 1985, order number SV21-8005, part number 74X9975, herein incorporated by reference, chapter 1 under commands chmod and open.

In the AIX operating system, files have owners. There is the user that owns the file, identified by a user id, and there is a group that owns a file, identified by a group id. These two ids are stored in an information structure for the file called its inode. An additional attribute of an AIX operating system file is a set of mode bits. Nine of these mode bits are used to control access to the file. These nine bits are composed of three triplets: the first triplet for the owning user of the file, the second triplet for the owning group, and the third triplet for all others. Each triplet has its first bit set if read access is allowed, its second bit set if write access is allowed, and its third bit set if execute access is allowed. Thus, a pattern of 111 101 000 means that the owning user, henceforth referred to as the owner, of the file has read, write, and execute permission for the file; the owning group, henceforth referred to as the group, has read and execute access; and all others have no access.

Users in the AIX operating system belong to a group. Furthermore, each user is a member of a concurrent group set. Users have group access to a file when the file's group is the group that the user belongs to or is one of the groups in the user's concurrent group set. Users and groups in the AIX operating system, are identified by user ids and group ids. These ids are simply integers.

The machine providing the resources has to make the determination as to the authorization level that a remote user will have to the remote machine's resources. The authorization operation is also an expensive operation. There is a problem of minimizing the authorization operation for each request and operation that is performed by a user, while still maintaining a secure distributed processing environment. In addition, users can change their level of authorization on a stand alone system, and should be able to make similar changes when dealing with a remote machine. Such a change might include a method whereby the user temporarily changes the user id of the user. Some privileged users are allowed to change their user id to a different user id. If a user id changes, the authorization for the changed user id should be different on the server. This creates a problem if the server has not been notified of the changed user id.

SUMMARY OF THE INVENTION

It is therefore an object of this invention to perform the authentication operation once while maintaining the authentication information by the remote machine.

The system and method of this invention authenticates a user by sending a message from the user machines to the remote machine, i.e., from the client to the server, to perform the authentication. Once the user becomes authenticated, it is not desirable to repeat the authentication operation. However, the server is not forced to remember indefinitely the authentication and authorization information. Instead, an image of the user on the server is created, and then reconstructed for each request that the user makes. A method is invoked that concisely represents all of the capabilities of the user on the server, saves this information, and then reconstitutes the image of the user on the server each time that an authentication request is run on that server for that user.

A message, called a request for service, is sent from the user client machine to the server remote machine anytime that service is needed on the remote machine. The request for service contains enough information to insure that the remote user is authorized to use the server and the set of credentials and capabilities the user is to have when using resources on the server machine. The server builds a set of credentials that represent all of the interesting security facts about the remote user. This information includes the user id, the group id that the user is in, the group set of other group ids that the user has access to, an account id, the set of privileges of the user that allow the user to bypass the normal security restrictions on the system, etc. The server establishes all of the credentials for the user, and stores this information in a data structure called the credentials structure, and returns a small value (e.g. 64 bits) to the client machine where the user is running. This returned small value is referred to as the credentials identifier.

After the credentials identifier is returned to the user, all the user has to do is to present the credentials identifier to the server in every request requiring authentication that is made of that server. The server utilizes the credentials identifier to reconstitute the set of credentials that are saved away for that user.

The server initiates a process to handle the request from the user, takes the credentials identifier found in the message, and examines the table of credential structures for the one having the corresponding credentials identifier. The server gives the process the user identity, the set of privileges, etc., while the process is executing the request. Further, if this operation requires authorization, one of the first steps while executing the request will be a check to determine if the process, with its newly acquired capabilities, is authorized.

The credentials identifier only has to be created once, and then can be used over again without going back through the authentication process. Moreover, any request from a user machine will fail if the credentials identifier is bad. A credentials identifier may go bad simply because the server no longer wants to hold the credentials structure for that user. The server machine may decide that the credentials information has been held long enough from a time since the last activity from the user. The server may discard the credentials information to make roof for other work being performed by other users so as not to tie up the server's resources. If the discarded credentials identifier does later get send to the server, the server will not find the credentials identifier in the stored table of credential structures. The server will then reject the clients request because the server no longer has a valid set of credentials for that user.

The user is then required to go through the authentication and authorization process of a request for service. The user has to authenticate the user to the server. The server has to authenticate the user's level of authorization, build a new credentials structure, and return a new credentials identifier. The user machine now has a new credentials identifier, and can retry the original request.

The system and method of this invention has the benefit that the server is not required to store the user information longer than needed or desired by the server. This provides for the cases in which the authentication for a user is good for a specified length of time, such as a certain number of minutes or hours or days. After this predetermined period of time, the server discards the credentials structure, and will no longer honor a request containing that credentials identifier. This forces the user machine to perform a new request for service, thereby inherently enforcing a periodic authentication of remote users in order to ensure that there has not been a masquerading of users.

This allows a flexible authentication and authorization process since it allows each server in a distributed data processing system to determine the length of time that the credential structure will be maintained. Consequently, the client uses are forced to handle the possibility that a request will be rejected because the credentials identifier has gone bad. Likewise, clients may lose the client's credentials identifier. This may happen if the client machine is powered off. If a client loses the credentials identifier, a request for service will reestablish a new set of credentials.

DESCRIPTION OF THE PREFERRED EMBODIMENT

Figure 1:
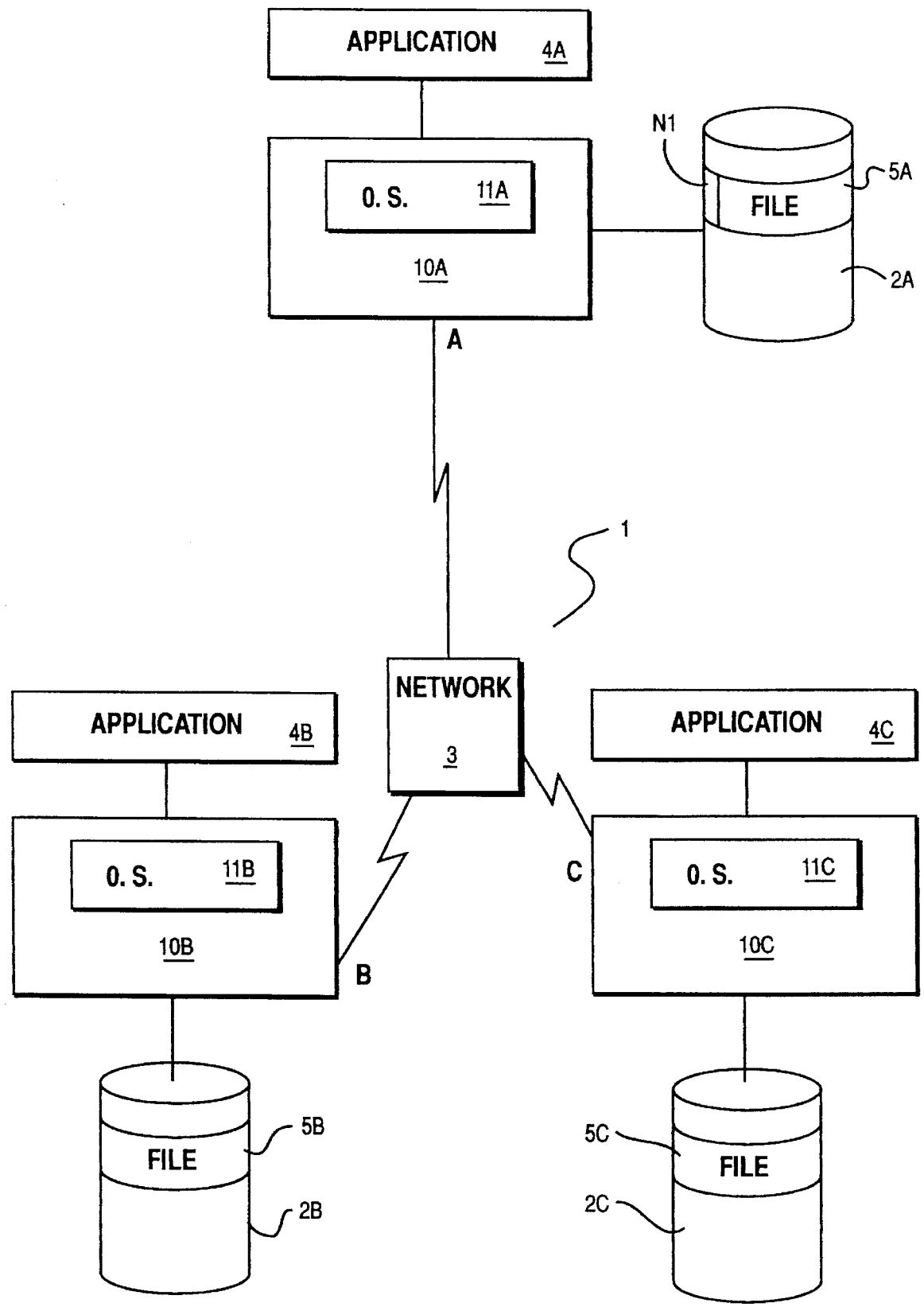
FIG. 1 is a block diagram of a distributed data processing system known in the art.
Figure 2:
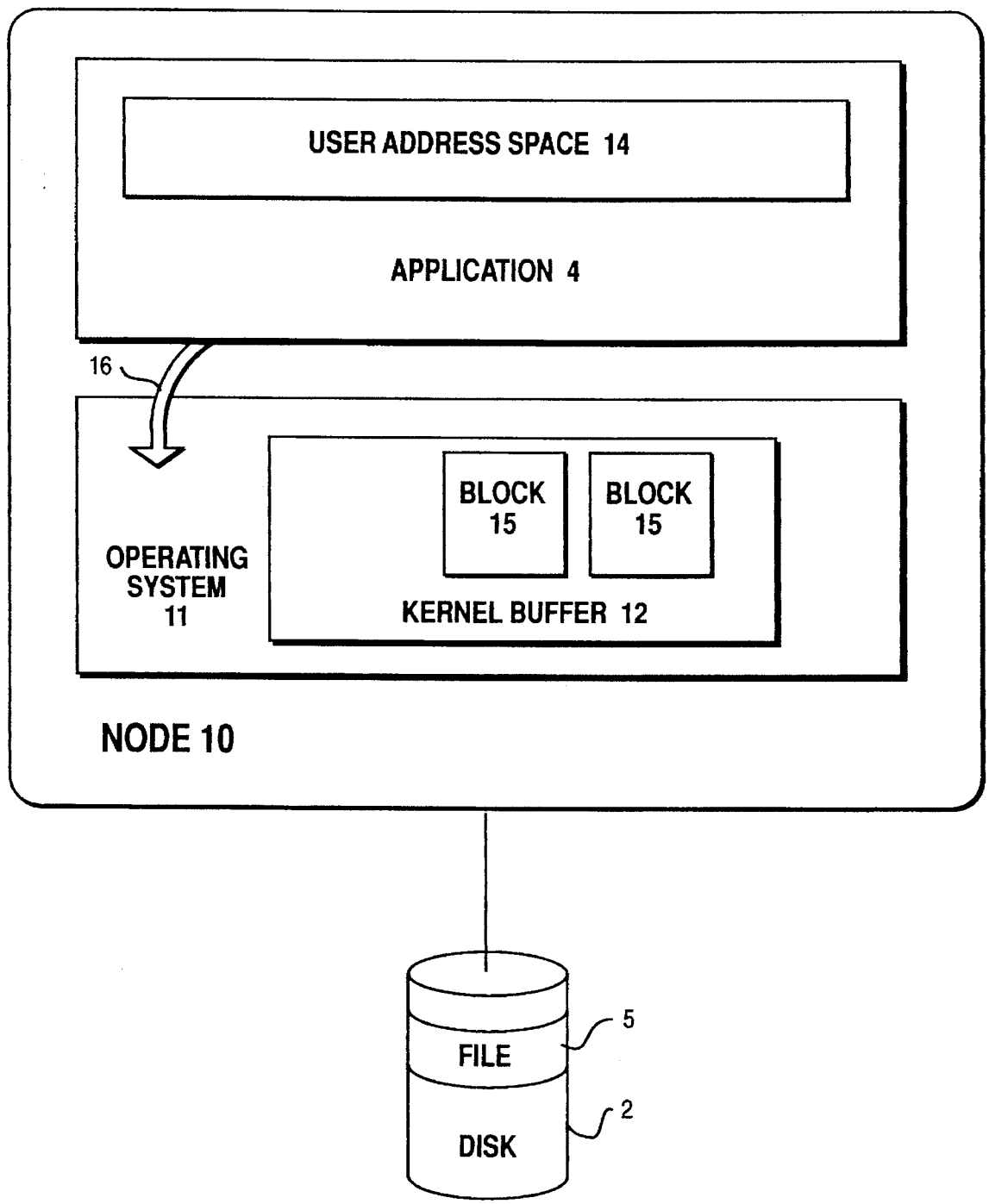
FIG. 2 is a block diagram showing a stand-alone data processing system known in the art for accessing a file through system calls.
Figure 3:
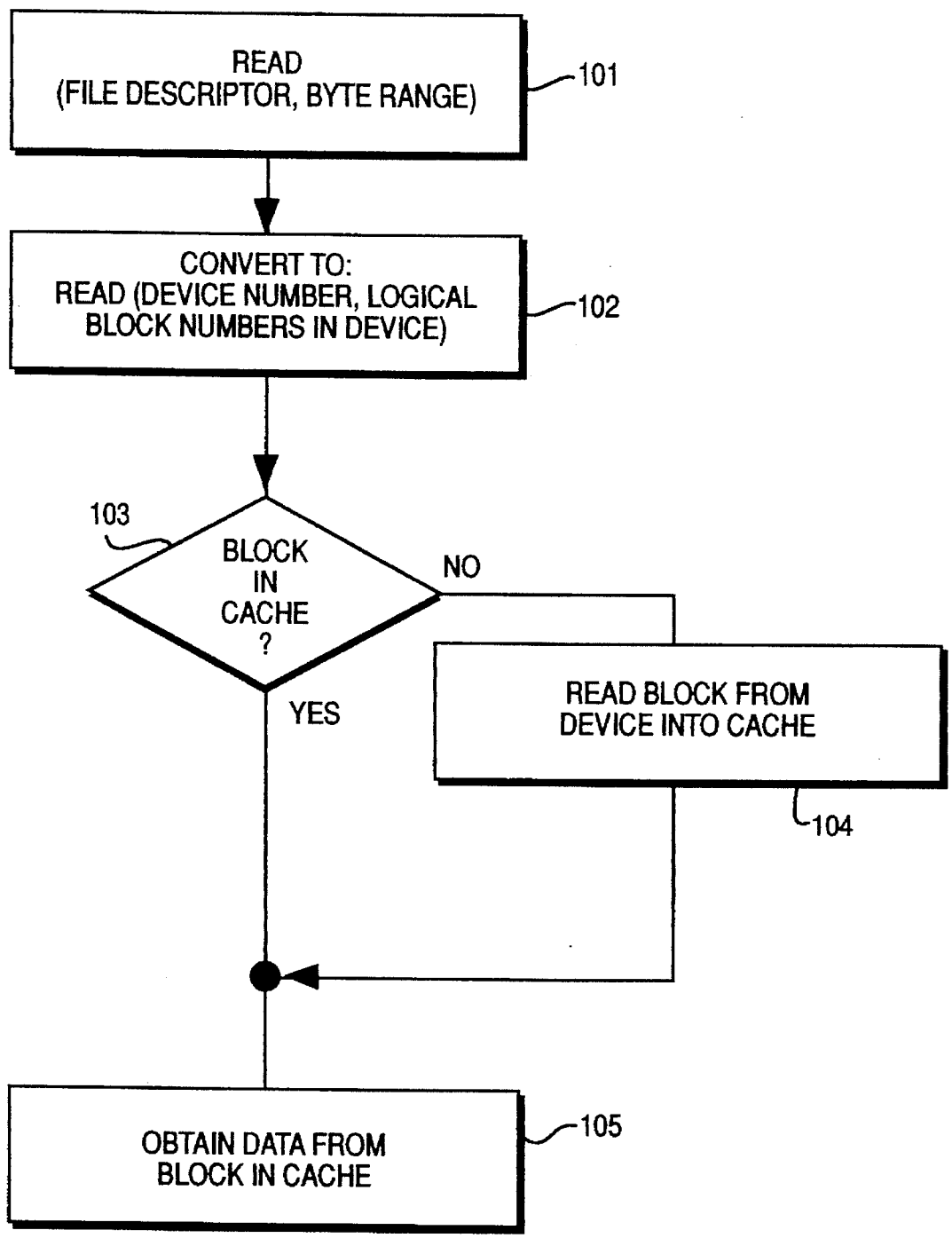
FIG. 3 is a flow diagram of the data processing system of FIG. 2 accessing a file through a system call.
Figure 4A:
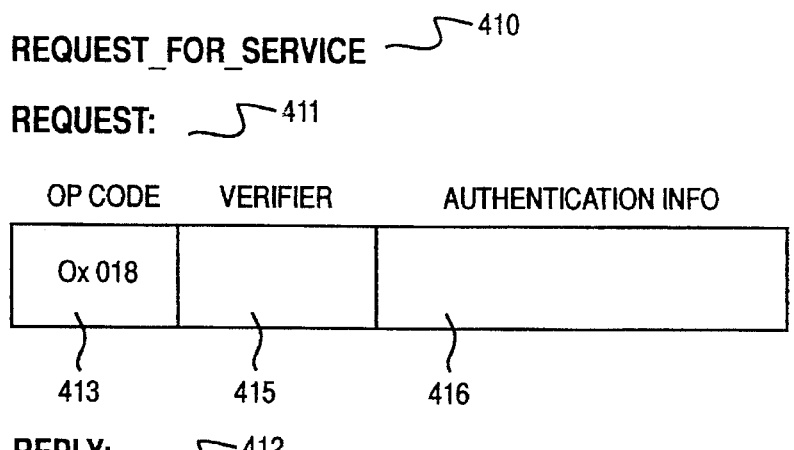
FIG. 4A is a request_for_service message which is used by a process running on a client machine in order to request that a set of credentials be constructed on a remote machine for the process.
Figure 4A:
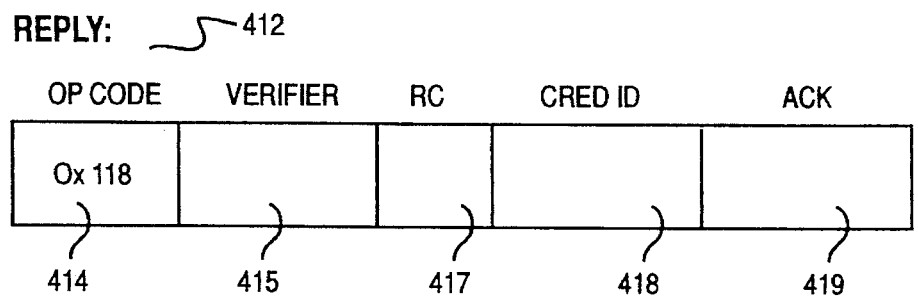
Figure 4B:
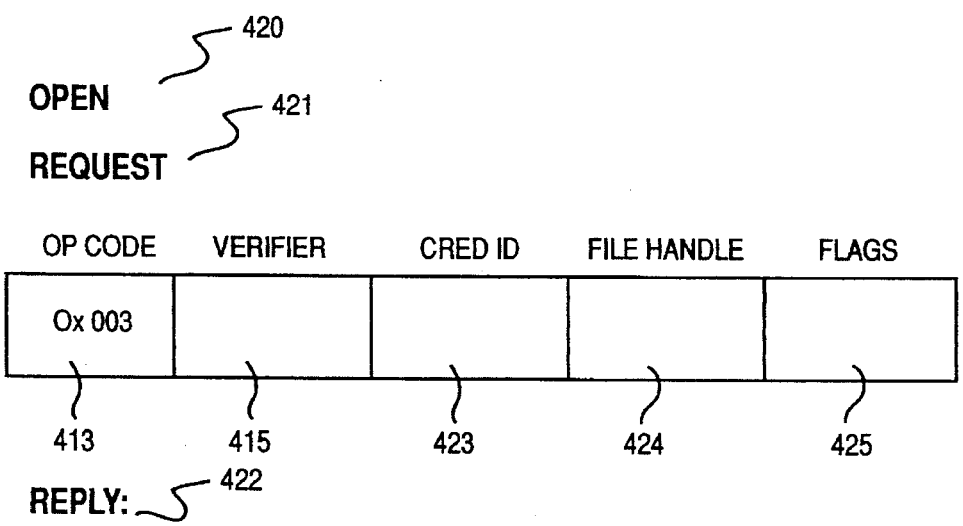
FIG. 4B is a open message used to open a file.
Figure 4B:
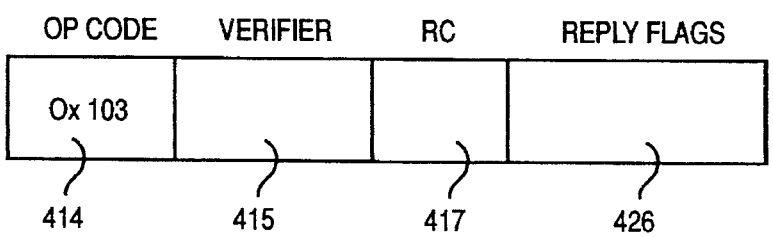
Figure 4C:
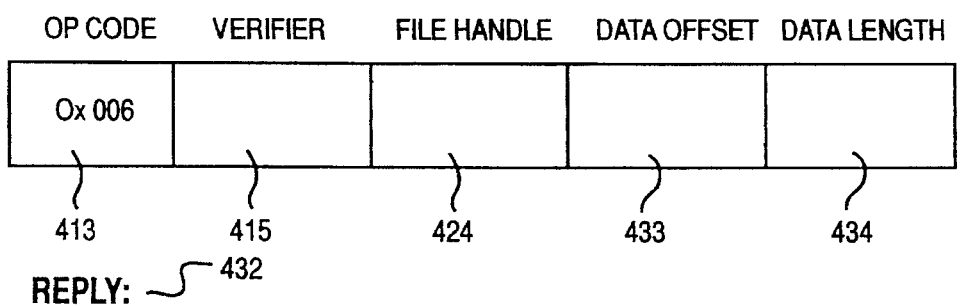
FIG. 4C is a read message used to read the contents of a file.
Figure 4C:
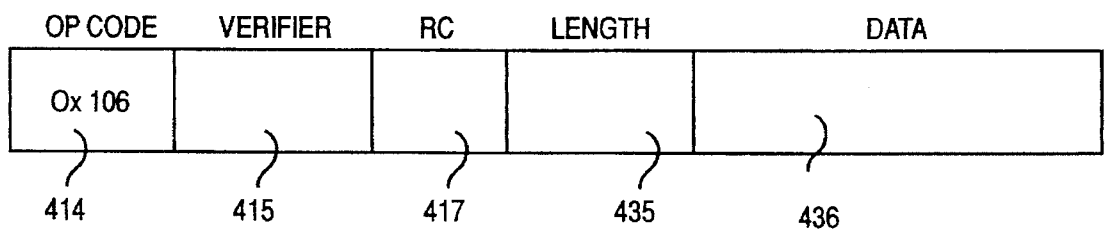

With reference to FIGS. 4A–4C, the internode messages used herein are described.

FIG. 4A shows the request_for_service message 410 which is used by a process running on a client machine in order to request that a set of credentials be constructed for the process on a remote machine. The request 411 has an opcode 413 indicating the specific operation requested. The request 411 also has a verifier field 415 that is used for machine to machine verification. The authentication info field 416 in the request is used to pass enough information to the remote machine to authenticate the process performing the request. The remote machine responds with the replay 412. The opcode field 414 indicates that this is the reply for the particular kind of request. The return code (rc) 417 in the replay is used to indicate the success or failure of the remote machines attempt to execute the request. A credentials identifier is returned in the cred id field 418, and acknowledgement is returned in the ack field 419. The ack is used to verify that correct identification between the requesting process and the remote machine has occurred.

FIG. 4B shows the open message 420. The request 421 has credentials id field 423 that is used to identify to the remote machine the credentials of the process that is attempting to perform the open. The open request is to open a file identified by the file handle 424 in an open mode, specified by the flags in field 425. The reply 422 to this request by the remote machine includes flags 426 to indicate the way in which this open file can be used.

FIG. 4C shows the read message 430 which has a request 431 containing a data offset 433 and data length 434 describing a range of data to be read. The reply 432 contains a length 435 and the returned data 436.

Figure 5:
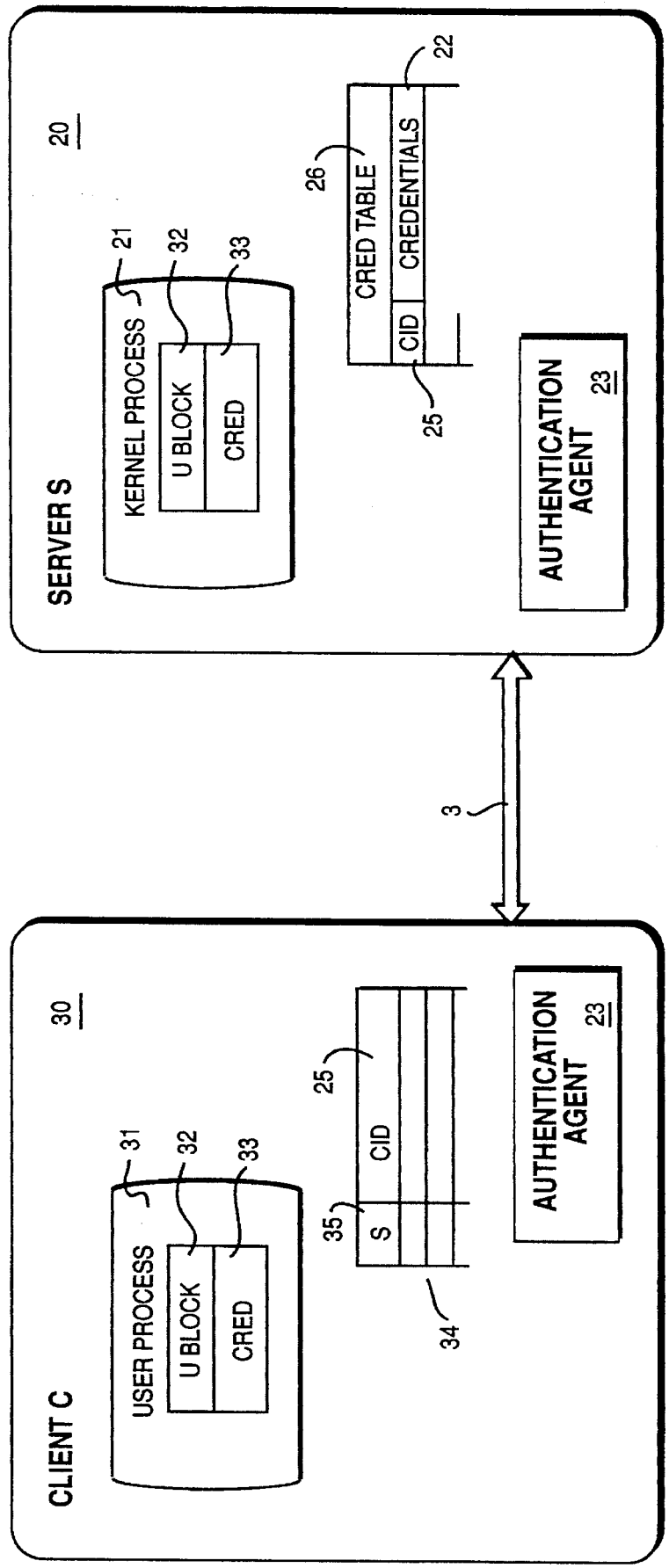
FIG. 5 shows a client data processing system and a server data processing system in the distributed data processing system of this invention.

Referring to FIG. 5, a client machine 30 is connected over a network 3 to a server machine 20. Within the client machine, a user process 31 has a ublock 32 containing a pointer 33 to a current credentials identifier list 34 for that user process. Entries within this credentials identifier list 34 have remote machine identifiers 35 and corresponding credentials ids 25. Within the server machine 20, there is a kernel process 21 which also contains a ublock 32 and a credentials pointer 33. Additionally at the server, there will be a credentials table 26. Each active entry in the credentials table has a field 25 containing the credentials id, and a corresponding set of credentials 22. Both machines have an authentication agent 23 that is used to assist in the interpretation of the authentication information.

Figure 6:
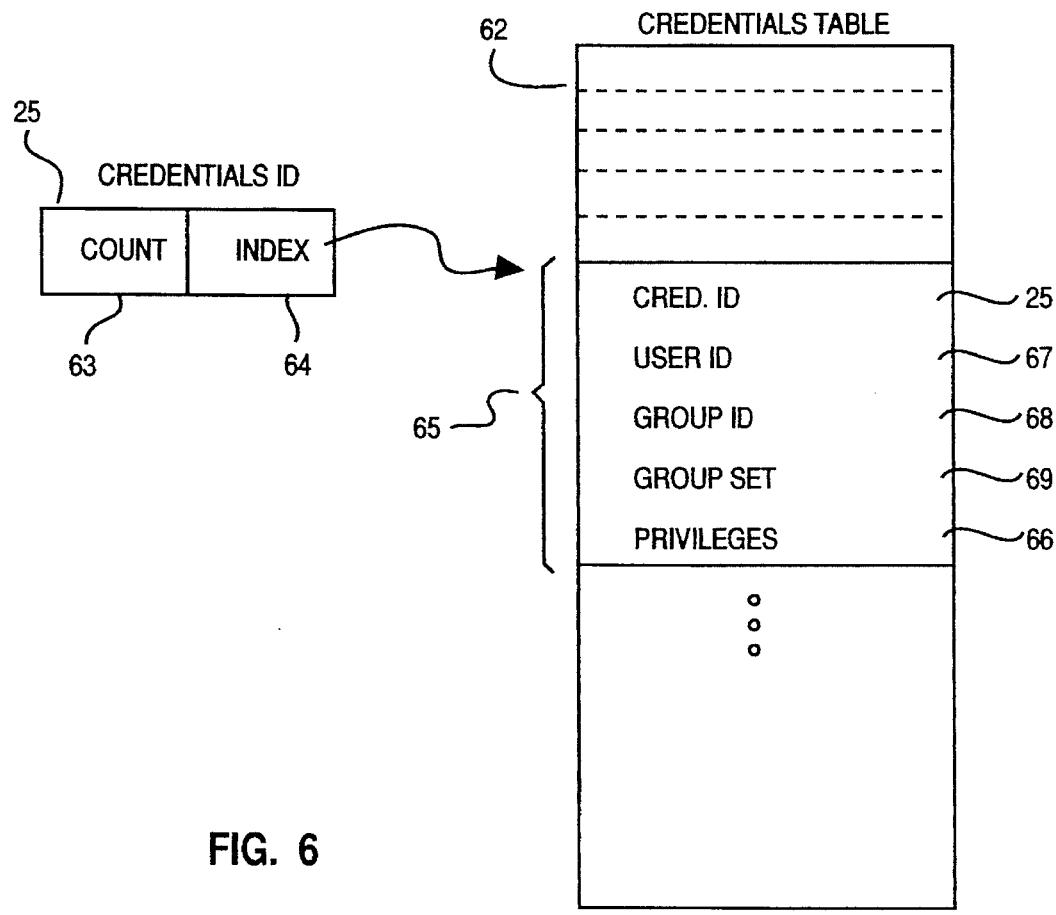
FIG. 6 illustrates a credentials table of this invention.

Referring to FIG. 6, a credentials identifier 25 is composed of two fields in this preferred embodiment, a count 63 and an index 64. The index 64 allows easy retrieval of the corresponding set of credentials 65 found in the credentials table 62. The set of credentials 65 found in the credentials table 62 has a credentials id 25, user id 67, which is a numeric id identifying a particular user on the system, a group id 68 identifying a particular group on the system, a group set field 69 identifying a set of concurrent groups for this user, and a privilege field 66 identifying a set of privileges for the process with these credentials. Privileges give the process the ability to perform actions that are normally forbidden. For example, the bypass discretionary access control privilege grants a process the ability to have access to files that normal permission checking would not allow. Such privileges are usually reserved for processes performing administrative tasks.

In the preferred embodiment, every process executing on a machine has a set of credentials. These credentials 33 reside within data structure called a ublock 32 associated with each process, either a user process 31 or a kernel process 21. The credentials include information identifying the user that the process is running on in behalf of, the group that the process is running on in behalf of, and any special privileges that this process has, such as the privilege to change the user id.

The id for an individual on one machine can be different from the id for the same individual on a different machine, due to separate administration of the two machines. When a user on one machine runs a process that is attempting to access resources on a remote machine, the user id for the user on the first machine must be translated to that user's id on the second machine. Likewise, the user's group id and the user's concurrent group set must be translated to their corresponding values on the remote machine. This is done in order to allow the remote machine to make meaningful authorization decisions. Furthermore, there must be a secure and trustworthy mechanism for performing this translation. In effect, users must be authenticated as particular individuals with particular attributes, such as group, to remote servers.

The actual authentication mechanism is not a part of this invention. Ser. No. 07/352,518 filed concurrently herewith on May 15, 1989, in the name of Loucks et al for "A Flexible Interface To Authentication Services In A Distributed Data Processing System", herein incorporated by reference, discloses some authentication mechanisms that can be implemented.

The authentication of remote users by servers can be performed in various ways. Under some circumstances, there is very little reason to be suspicious of requests arriving at a server and low cost authentication of remote users is justified. In other environments, servers must exercise greater vigilance. No one policy will be best for all cases. Therefore, this invention supports a range of authentication and authorization policies.

In the preferred embodiment of this invention, authentication is performed by passing an object called the authentication info 416, FIG. 4A, from the client machine to the server machine and receiving an acknowledgement called the ack 419 sent from the server back to the client. The actual contents of the authentication info object and the ack depend upon the particulars of the authentication mechanism and are not described herein. Loucks et al demonstrates the adequacy of this model for the support of a variety of authentication mechanisms. Within the preferred embodiment, the authentication agent 23, FIG. 5, at the client, takes as input a user process's credentials 33 found in the ublock 32 and constructs the authentication info object 416, FIG. 4A. At the server, the authentication info object is processed by the server's authentication agent. This processing constructs a set of credentials that are meaningful as the server.

The request_for_service message 410 contains verifier field 415 in both the request 411 and the reply 412. Similarly, almost all other messages in the environment in which the preferred embodiment of this invention is utilized have verified fields. This verifier is assumed to be present for support of secure communications between nodes in the network. This verifier is constructed cryptographically so as to be an unforgable verification that the true identity of the sending node is made known to the receiver. Thus, the verifier is used for node to node identification.

Figure 7:
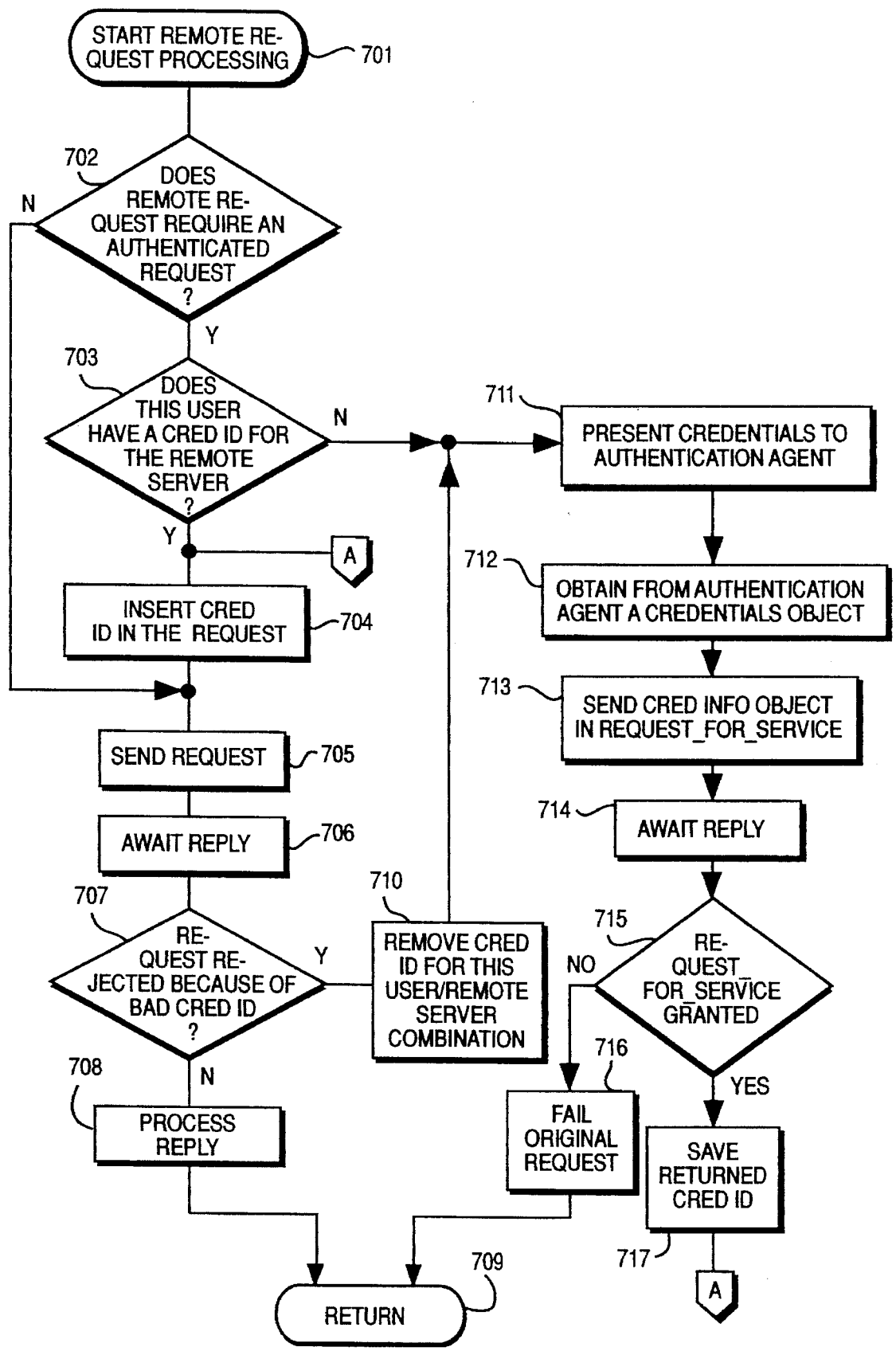
FIG. 7 is a flow diagram showing the processing of an operation that is requested of a remote server.

FIG. 7 represents the processing of an operation that is requested of a remote server, such as opening a remote file with the open message, reading from a currently opened remote file with the read message, writing to a remote file, and querying a remote file's attributes, or performing operations such as locking truncating, creating, deleting, etc. Processing starts at step 701. The type of operation is examined to determine whether or not the operation requires an authenticated request, step 702. Messages having credentials id correspond to those operations requiring authenticated requests. For example, open requires an authenticated request, and a read operation does not. If authentication is required, processing continues at step 703 where the credentials list for this user is examined in an attempt to find a credentials id for the server that will be performing the remote operation. If a credentials id is found, it is inserted into the message for the original request, step 704. The request is sent, step 705. The reply is waited for, step 706. If the reply indicates that the request is rejected because of a bad credentials id and the retry limit for attempting to obtain a good credentials id has not been exceeded, step 707, the bad credentials id for the server is removed from the process's credentials list, step 710, and a new credentials id is obtained by performing steps 711–717. If no credentials id exists at step 703, processing also continues at step 711 where the current process's credentials are presented to the authentication agent. The authentication agent constructs a credentials info object this is obtained, step 712. This credentials info object is sent in a request_for_service message to the server, step 713, and a reply is waited for, step 714. After receiving the reply, it is examined to determine if the request_for_service was granted by the server, step 715, and if it was not, the original remote operation cannot be performed, and fails, step 716. At step 715, the ack field returned in the reply to the request_for_service message is also checked to ensure that it matches a value obtained from the authentication agent during step 712. If the ack values don't match, there has been a failure to properly validate the remote machine and processing continues at 716. If the request_for_service was granted by the server, a credentials id is returned, and is saved in step 717 for future use. The original request is now reattempted as processing continues at step 704. At step 707, if it is determined that the original request's credentials id was accepted or that the retry limit was exceeded, then the reply to the original request is processed including the possibility of an exceeded retry limit, step 708, and processing of the remote request is complete, step 709.

The following programming design language code reflects the above described operation.

```
/*do remote operation by sending a request to server*/
/* variables */
proc:          the process performing the request;
server:        the remote server that is being asked to
               perform a request;
request:       the request;
retry_limit:   a limit on the number of retries that
               will be made in attempting to obtain a
               good cred id for the server;
/* code: */
IF request has no cred id field THEN
    /* no authentication is required for request */
    send request;
    await reply;
    process reply;
    RETURN;
ENDIF;
/* otherwise, request does require authentication */
attempts = 0; /* retry count */
LOOP
    search proc's credentials list for a cred id
        for the server;
    IF no such cred id is found THEN
        /* obtain a cred id */
        present proc's credentials to authentication
            agent;
        obtain from authentication agent a
            credential info object and
            an expected ack;
        send credential info object to server in a
            request_for_service message;
        await reply;
        IF request_for_service not granted THEN
            fail original operation;
            RETURN;
        ENDIF;
        /* reply indicates request_for_service */
        /* succeeded, check ack */
        IF reply's ack field != expected ack THEN
            /* remote machine not validated */
            fail original operation;
            RETURN;
        ENDIF;
        /* request_for_service granted */
        save returned cred id in proc's credentials
            list; /* for later use */
    ENDIF;
    /* here, acred id has been found or obtained */
    insert cred id in request;
    send request to server;
    await reply;
    IF reply rejected because of a bad cred id THEN
        remove cred id from proC's credentials list;
    ELSE
        process reply;
        RETURN;
    ENDIF;
    attempts = attempts + 1;
    IF attempts > retry_limit THEN
        /* too many attempts have been made to    */
        /* obtain a good cred id, fail            */
        fail original operation;
        RETURN;
    ENDIF;
    /* try again */
ENDLOOP;
```

Copyright IBM Corporation 1989

Figure 8:
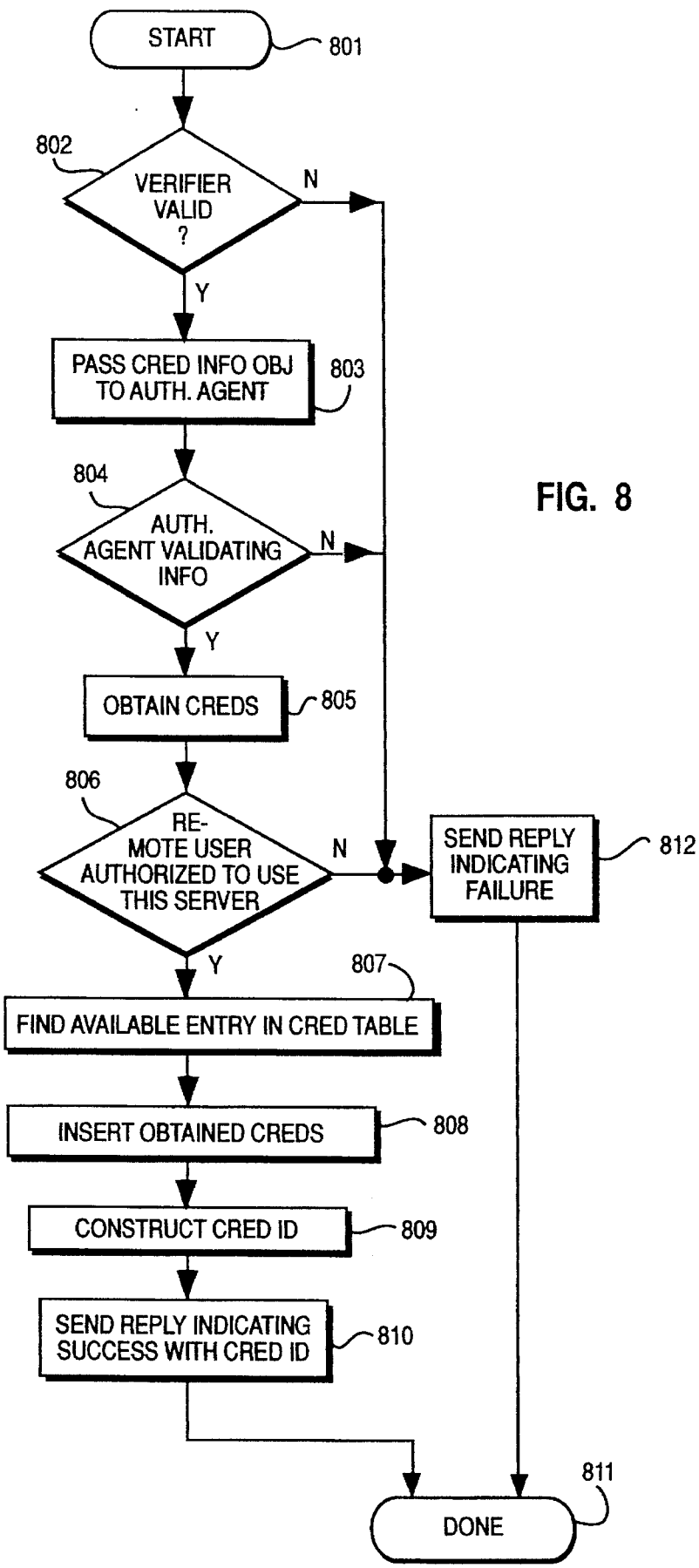
FIG. 8 is a flow diagram showing the processing, at the server, of a request_for_service message for a remote machine.

FIG. 8 is a flowchart showing the way a server processes a request_for_service message for a remote machine. Processing begins at step 801. The verifier field in the message is checked for validity, step 802, to insure that the identity of the remote machine is known. If the verifier is found to be valid, the credentials info object found in the message, is passed to authentication agent at the server, step 803. If the authentication agent finds the credentials info object is valid, step 804, the credentials are obtained from the authentication agent, step 805. These credentials are examined and used to determine the identity of the remote user performing the request_for_service. A determination is made as to whether or not the remote process has access to this server, step 806. This determination can be made by examining lists of remote users authorized or forbidden to use this system. If the remote process is authorized, an available entry in the credentials table is located, step 807. This may involved discarding an entry that has not been recently used. The credentials obtained from the authentication agent, step 805, are inserted into the available entry step 808. A credentials id is constructed that corresponds to this entry by making use of the index for this entry and the count found previously at this entry, step 809. A credentials id is constructed from two parts. The first part is an index into the credentials table for an entry that corresponds to this credentials id. The second part is a count that is incremented each time the credentials table entry at the index found in the first part has a new set of credentials stored into it. Servers are free to reuse credential table entries without the possibility that previously distributed credentials ids will mistakenly select an entry that has been reused for a new set of credentials. A reply is sent indicating a successful request for service along with the constructed credentials id. Processing finishes at step 811. At steps 802, 804, and 806, the test may fail to be passed causing a reply to be sent indicating failure of the request_for_service , step 812.

The following programming design language code illustrates the above.

```
/*process a request_for_service at the server*/
msg: the request_for_service request
IF msg's verifier field valid THEN
    /* remote node's identity is correctly established */
    pass msg's cred info object to
        authorization agent;
    IF auth. agent validates cred. info object THEN
        obtain credentials from authorization agent;
        IF remote user identified in credentials is
            authorized to use this server THEN
            search credentials table for an
                available entry;
            IF no available entry THEN
                find least recently used entry;
                discard credentials in this entry;
            ENDIF;
            insert obtained credentials in the
                entry;
            /* construct credentials id */
            first part of cred id = index of the
                entry;
            second part of cred id = second part of
                cred id found in the entry + 1;
            send reply indicating success along
                with the constructed cred id;
            RETURN;
        ENDIF;
    ENDIF;
ENDIF;
send reply indicating failure;
RETURN;
```

Copyright IBM Corporation 1989

Figure 9:
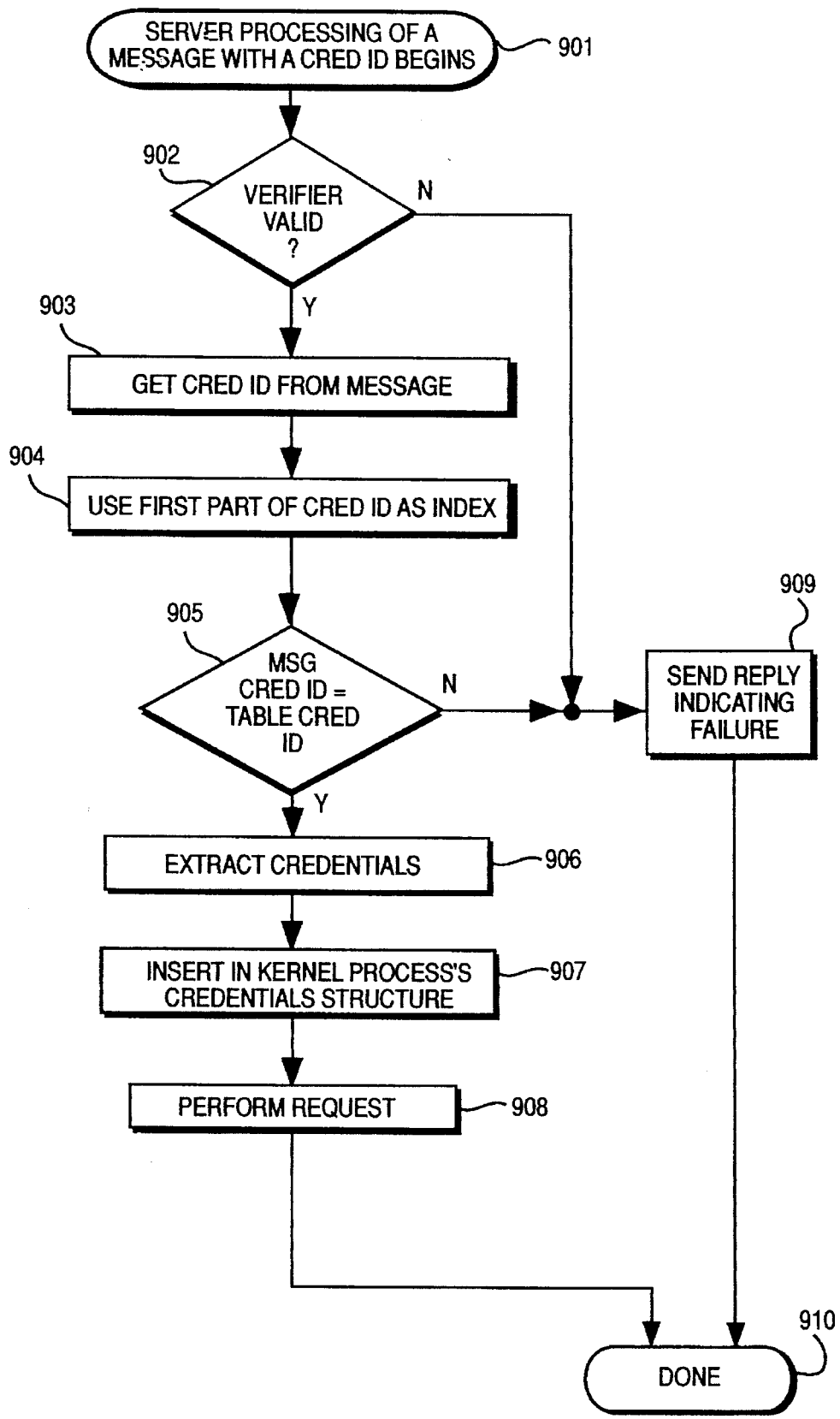
FIG. 9 is a flow diagram showing the processing, at the server, of a message having a credentials id.

FIG. 9 shows a flowchart for processing at the server a message having a credentials id, such as the open message. Beginning at step 901, the verifier of the received message is checked for validity, step 902. If the verifier is found to be valid, the credentials id is extracted from the message, step 903. The first part of the credentials id is used as an index into the credentials table, step 904. The credentials id found in the credentials table is compared with the credentials id extracted from the message, step 905. If they are equal, the credentials in the table entry are extracted, step 906, and used by the kernel process that will perform this request at the server, step 907. The request is then attempted, step 908, after which processing is complete, step 910. If the verifier is found to be invalid in step 902 or the credentials id is found to be invalid in step 905, a reply is sent indicating the cause of the failure, step 909. It is worth noting that in performing the requested operation in step 908, other successful or unsuccessful replies may be returned to the client. For example, a remote user can have a valid credentials id because the user has been authenticated and authorized to use the server, however, the credentials that are established for the kernel process that is running on the user's behalf may not provide access to a file that the user is attempting to open and the operation may fail. It should be further noted that some remote requests, such as a read operation, do not require this kind of processing because they do not have a credentials id in the request. If the preferred embodiment, a read operation can be performed only after a successful open, which does not have a credentials id. Therefore, there is no need to require the authentication checks on a read operation.

The following programming design language code describes the above operation.

```
/*processing a request having a credentials id*/
msg: the message received by the server;
IF msg's verifier field is valid THEN
/* remote node's identity has been established */
    get msg's cred id;
    look up credential table entry at index
        specified by first part of cred id;
    IF cred id in table == msg cred id THEN
        /* credentials in table correspond to */
        /* the cred id received in message */
        extract credentials from table;
        insert them into the kernel process
            that will run request;
        perform the request with the kernel
            process;
        RETURN;
    ELSE
        /* credential table entry has been     */
        /* reused, indicate that the msg       */
        /* cred id is bad, forcing the         */
        /* client machine to perform a         */
        /* request_for_service to obtain a     */
        /* new cred id.                        */
        send reply indicating failure, bad
            cred id;
        RETURN;
    ENDIF;
ELSE
    /* verifier invalid */
    send reply indicating failure;
    RETURN;
ENDIF;
```

Copyright IBM Corporation 1989

Servers will open a file for a process on a client only if the permissions on the file allow such access by the remote process. Once the file has been opened, e.g. reading, it is desirable to allow subsequent read operations to be performed without this authorization check. This is accomplished by requiring a credentials id 423, FIG. 4B, on the open request 421 that allows the server to check the remote process's access rights to the file. While the file is open, the credentials id is not required from the client machine for access to the file's data; therefore, the read request 431, FIG. 4C, does not require a credentials id. The client obtains the credentials id by using the reuest_for_service request.

Any client to server request requiring a credentials id, e.g. open, create, can be rejected because of a stale credentials id. A credentials id can go stale because the server has lost the corresponding credentials due to being temporarily powered down, reuse of the credentials table entries by more recently created credentials, or authentication policies that require peridoic re-authorization. Clients must be able to accept rejected requests, use the request_for_service to establish a fresh credentials id, and reissue the original request.

The request_for_service request passes a set of information describing a client process to the server and it returns, among other things, the corresponding credentials id. The data that is passed between the two machines will depend upon the authentication and authorization policy, supported by the authentication agent, that the requester is expecting the receiver to use in the processing of the request_for_service.

The credentials id is returned to the client machine where it can be stored by the original requesting process for use in subsequent operations requiring a credentials id. In the AIX operating system, processes can create other processes. This is done through the fork operation which creates a process known as a child process. Such child processes have the same authentication properties as their parent, for example, the same user and group ids. This means that a child process can inherit the parent process's credentials ids and use them in subsequent operations, avoiding the overhead of initiating a separate request for service authentication operation.

When a process changes it authentication properties, for example by changing its current group or user id, any credentials ids that is has, no longer corresponds to these properties. Therefore, any time that a process changes any of it authentication properties, all of its credentials ids are invalidated. Remote operations that occur after such an invalidation will require the acquisition of new authentication ids.

A process may be using several remote servers and have a separate credentials id for the use of each one. Each credentials id is acquired by the process as it is needed by sending a request_for_service to the corresponding server.

A receiver of a request_for_service request may or may not decide to honor the request if it is based on a policy that it supports, and a receiver will reject the request if it is based on a policy that the receiver doesn't wish to support for the sender. In this way, a group of machines may require only low cost authentication with easy administration between members of the group but require more secure authentication for communication with machines outside the group. This implies that the credentials info object constructed by the authentication agent at the client and processed by the authentication agent at the server includes identification of the policy that is to be used.

In summary, the steps that occur in establishing a credentials id for use by a process are as follows:

1. The client kernel determines that there is no current credentials id for use by the process in making a request of the server or that the current credentials id is no longer being accepted by the server and that a new one needs to be created.

2. The client kernel passes information describing the process to the client authentication agent.

3. The client authentication agent uses this information, which includes the process user, group, group list, and so forth, to build a buffer of data, called the credentials info object. The format of this data will depend upon the policy that the authentication agents are using.

4. The client kernel obtains the credentials info object from the authentication agent and passes it to the server in a request_for_service request.

5. The server passes the credentials info object to its authentication agent.

6. The server authentication agent processes this data, applying the authentication policy and the authorization policy, which determines what credentials the remote process should have at the server. The server authentication agent builds a set of credentials that satisfy these policies and passes these credentials back to the server kernel.

7. The server kernel receives the credentials, representing the local user id, group id, group list, special privileges, and so forth, that the kernel process should have when it performs operations at the server. This set of credentials is cached in a kernel data structure called the credentials table.

8. The server sends a reply to the request_for_service to the client. This reply contains a credentials id, constructed by the server, that allows the server to find the corresponding credentials in its credentials table.

9. The client receives the credentials id in the reply.

While the invention has been particularly shown and described with reference to a preferred embodiment, it will be understood by those skilled in the art that various changes in form and detail may be made without departing from the spirit and scope of the invention.

We claim:

1. A method for determining credentials of a process, running at a first data processing system, when accessing a service at a second data processing system, said method comprising:

creating, at the second data processing system, a set of credentials for said process in response to a first request received from said first data processing system;

returning a value to said first data processing system;

receiving, at the second data processing system, a second request from said first data processing system comprising said value; and using the value to determine said set of credentials for said process during access to the service at the second data processing system.

2. A method for authorizing a process running at a first data processing system to have access to a service at a second data processing system, said method comprising:

creating, at the second data processing system, a set of credentials for said process in response to a first request received from said first data processing system;

returning a first value identifying said set of credentials to said first data processing system;

receiving, at the second data processing system, a second request from said first data processing system comprising a second value;

determining, at the second data processing system, if the second value identifies the set of credentials; and allowing the access to the service as controlled by the set of credentials if the second value identifies the set of credentials.

3. The method of claim 2 wherein the second received request is received from the process.

4. The method of claim 2 wherein the second received request is received from a child process of said process.

5. A method for authorizing a process running at a first data processing system to have access to a service at a second data processing system, said method comprising:

creating, at the second data processing system, a set of credentials for said process in response to a first request received from said first data processing system;

returning a first value identifying said set of credentials to said first data processing system;

receiving, at the second data processing system, a second request from said first data processing system comprising a second value;

determining, at the second data processing system, if the second value identifies the set of credentials; and denying access to the service if the second value is determined not to identify the set of credentials.

6. The method of claim 5 wherein the determining step determines that the second value does not identify the created set of credentials when the second data processing system requires an authentication of the process.

7. The method of claim 6 wherein the determining step determines that the second value does not identify the created set of credentials when the second data processing system has previously discarded, and not yet re-authorized said process, at least one element of the set of credentials.

8. A method for obtaining authorization of a process running at a first data processing system to have access to a service at a second data processing system, said method comprising:

sending, to said second data processing system, a first request from said first data processing system comprising information required by said second data processing system to construct a set of credentials for said process;

receiving, by said first data processing system, a value from said second data processing system identifying said set of credentials;

sending, to the second data processing system, a second request from said first data processing system comprising said value; and obtaining access to the service as controlled by the set of credentials if the second request identifies the set of credentials.

9. A method of claim 8 further comprising maintaining said value in a data area of said process after being received from said second data processing system.

10. A method of claim 9 further comprising obtaining said value from said data area by a child process and sending said second request from said child process with said obtained value.

11. A method of claim 9 further comprising discarding the value in said data area if the set of credentials corresponding to the value is changed.

12. A method, in a data processing system, for authenticating a user on a local client machine and for authorizing access to at least one resource of a remote server machine, wherein said local machine and said remote machine are connected by a communications link, said method comprising:

sending a message having authentication information, from said client machine to said server machine, requesting service from said server machine;

creating, by said server machine, a credentials structure, having security information of said user based on said authentication information from said sent message, for authorizing a use of said at least one resource by said server machine;

returning, to said client machine from said server machine, a credential identifier identifying the user with said created credentials structure;

using said credential identifier by said user in each subsequent request for service message from said user to said server machine; and reconstituting the security information, from said created credentials structure identified by said credential identifier in said each subsequent request for service message, for automatically establishing authentication of the user and authorization to use said authorized resources of said server machine.

13. A method of claim 12 further comprising storing said created credentials structure for a time determined by said server machine.

14. A method of claim 13 further comprising determining the time to store said created credentials structure based on a length of time since a last activity from said user.

15. A method of claim 12 further comprising determining by said server if said credential identifier in said each subsequent request is valid.

16. A method, in a data processing system, for authenticating a user on a local client machine and for authorizing access to at least one resource of a remote server machine, wherein said local machine and said remote machine are connected by a communications link, said method comprising:

receiving, by said remote machine, a request for service message having authentication information from said user on said client machine;

creating a credentials structure, having authorization information for resources at the server for the user, based on the authentication information of the received request;

returning to the local client machine, by said remote machine, a credentials identifier corresponding to said created credentials structure;

storing said created credentials structure by said server for a time determined by said server;

discarding said created credentials structure after said determined time;

determining, by the server machine, the validity of the credentials identifier received from the local client machine on a subsequent request for service dependent upon whether the request for service was received within the determined time and the credentials structure is stored at said server;

honoring said subsequent request for service if the credentials identifier is determined to be valid; and requiring a new request for service and a new credentials structure if said credentials identifier is determined to be invalid, thereby enforcing a periodic authentication on said user.

17. A method, in a data processing system, for authenticating a user on a local client machine and for authorizing access to at least one resource of a remote server machine, wherein said local machine and said remote machine are connected by a communications link, said method comprising:

creating, by the server machine, a credentials structure having authorization information in response to authentication information provided by said user requesting a resource of said server machine;

storing said credentials structure for a period of time determined by said server machine;

discarding, by said server machine, said credentials structure after said determined period of time;

honoring, by said server machine, a subsequent request for service from said local client machine, having a credentials identifier corresponding to said credentials structure, in immediate response to said credentials identifier if said subsequent request is received within the predetermined time; and rejecting, by said server machine, said subsequent request for service from said local client machine in immediate response to said credentials identifier in said subsequent request if said subsequent request is received after the predetermined time and the credentials structure has been discarded.

18. A local data processing system having means for authenticating a remote user on a remote client data processing system and for authorizing access to at least one resource of said data processing system by said remote user, wherein said local data processing system and said remote client data processing system are connected by a communications link, said means comprising:

means for storing a credentials structure having authorization information for the resources of the local data processing system based upon authentication information received from said remote user during a request for service;

means, coupled to said means for storing, for discarding said credentials structure after a period of time determined by said local data processing system;

means, coupled to said means for storing, for immediately honoring a subsequent request for service from said remote client data processing system in response to an identifier, corresponding to said credentials structure, received with said subsequent request if said request is received within said determined time and said credentials structure is stored in said local data processing system; and means, coupled to said means for storing, for immediately rejecting said subsequent request for service from said remote client data processing system in response to said identifier received with said subsequent request if said subsequent request is received after said determined time and said credentials structure is discarded.

19. A local data processing system of claim 18 further comprising means for requiring a new request for service having authentication information if said subsequent request is rejected after said determined time, thereby enforcing a periodic authentication of said remote user.

20. A computer program product, residing on a medium in a form intelligible only by a computer input means, having means for operating a computer system to authorize a process, running at a first data processing system, to have access to a service at a second data processing system, said computer program product comprising:

means for operating said computer system to create, at the second data processing system, a set of credentials for said process in response to a first request received from said first data processing system;

means, coupled to said means for creating, for operating said computer system to return a value identifying said set of credentials to said first data processing system;

means, coupled to said means for returning, for operating said computer system to receive, at the second data processing system, a second request received from said first data processing system comprising a second value;

means, coupled to said means for receiving, for operating said computer system to determine, at the second data processing system, if the second value identifies the set of credentials; and means, coupled to said means for determining, for operating said computer system to allow the access to the service as controlled by the set of credentials if the second value identifies the set of credentials.

21. A computer program product, residing on a medium in a form intelligible only by a computer input means, having means for authorizing a process running at a first data processing system to have access to a service at a second data processing system, said computer program product comprising:

means for creating at the second data processing system, a set of credentials for said process in response to a first request received from said first data processing system;

means, coupled to said means for creating, for returning a first value identifying said set of credentials to said first data processing system;

means, coupled to said means for returning, for receiving at the second data processing system a second request received from said first data processing system comprising a second value;

means, coupled to said means for receiving, for determining, at the second data processing system, if the second value identifies the set of credentials; and means, coupled to said means for determining, for denying access to the service if the second value is determined not to identify the set of credentials.

22. The computer program product of claim 21 wherein the means for determining determines that the second value does not identify the created set of credentials when the second data processing system requires an authentication of the process.

23. The computer program product of claim 22 wherein the means for determining determines that the second value does not identify the created set of credentials when the second data processing system has previously discarded, and not yet re-authorized said process, at least one element of the set of credentials.

24. A computer program product, residing on a computer readable medium, having means for obtaining authorization of a process running at a first data processing system to have access to a service at a second data processing system, said computer program product comprising:

means for sending, to said second data processing system, a first request from said first data processing system comprising information required by said second data processing system to construct a set of credentials for said process;

means, coupled to said means for sending a first request, for receiving, by said first data processing system, a value from said second data processing system identifying said set of credentials;

means, coupled to said means for receiving, for sending, to the second data processing system, a second request from said first data processing system comprising said value; and means, coupled to said means for send a second request, for obtaining access to the service as controlled by the set of credentials if the second request identifies the set of credentials.

* * * * *